United States Patent [19]

Frese

[11] 4,218,551
[45] Aug. 19, 1980

[54] PROCESS FOR THE PRODUCTION OF POLYBUTENE-1 FORMABLE INTO TRANSPARENT FILMS

[75] Inventor: Albert Frese, Marl, Fed. Rep. of Germany

[73] Assignee: Chemische Werke Hüls Aktiengesellschaft, Marl, Fed. Rep. of Germany

[21] Appl. No.: 893,870

[22] Filed: Apr. 6, 1978

Related U.S. Application Data

[63] Continuation-in-part of Ser. No. 400,899, Sep. 26, 1973, abandoned.

[30] Foreign Application Priority Data

Sep. 29, 1972 [DE] Fed. Rep. of Germany ....... 2247786

[51] Int. Cl.² .................... C08F 4/66; C08F 10/08
[52] U.S. Cl. .................... 526/158; 526/348.6; 526/902
[58] Field of Search .................... 526/158, 348.6

[56] References Cited

U.S. PATENT DOCUMENTS

| | | | |
|---|---|---|---|
| 2,893,984 | 7/1959 | Seelbach et al. | 526/158 |
| 2,909,511 | 10/1959 | Thomas | 526/125 |
| 3,058,963 | 10/1962 | Vandenberg | 526/159 |
| 3,058,970 | 10/1962 | Rust et al. | 526/159 |
| 3,108,973 | 10/1963 | Vandenberg | 526/158 |
| 3,356,666 | 12/1967 | Rosen et al. | 526/348.6 |
| 3,362,940 | 1/1968 | Edwards et al. | 526/159 |
| 3,468,862 | 9/1969 | Schotland | 526/348.6 |
| 3,769,373 | 10/1973 | Reed et al. | 526/158 |

FOREIGN PATENT DOCUMENTS

| | | | |
|---|---|---|---|
| 2247786 | 4/1974 | Fed. Rep. of Germany | 526/158 |
| 909081 | 10/1962 | United Kingdom | 526/902 |
| 1017848 | 1/1966 | United Kingdom | 526/348.6 |

*Primary Examiner*—Edward J. Smith
*Attorney, Agent, or Firm*—Millen & White

[57] ABSTRACT

A polybutene-1 mixture which forms heat sealable, transparent film having good initial tear resistance and resistance to tear propagation are produced by polymerizing liquid butene-1 at 60°–120° C. employing as catalyst a dihalidefree mixture of diethylaluminum monochloride and $TiCl_3 \cdot nAlCl_3$ wherein n is 0.2 to 0.6, and isolating the unfractionated mixture of polymers.

9 Claims, No Drawings

PROCESS FOR THE PRODUCTION OF POLYBUTENE-1 FORMABLE INTO TRANSPARENT FILMS

CROSS REFERENCE TO RELATED APPLICATION

This is a continuation-in-part of Application Ser. No. 400,899, filed Sept. 26, 1973, now abandoned.

BACKGROUND OF THE INVENTION

This invention relates to a process for the production of a polybutene-1 formable into transparent sheets and heat sealable films, and to the polybutene-1 thus produced and films formed therefrom.

Films of highly isotactic polybutene-1 produced in a conventional manner, e.g., U.S. Pat. Nos. 2,909,511; 3,051,690; 3,058,963; 3,058,980; 3,108,973; 3,362,940; British Pat. No. 1,017,848; and Rust, et al., "Crystalline Olefin Polymers", Part I, Interscience Pub. N.Y. (1965) pp 333–334; have the disadvantage that they exhibit not only low transparency but also widely differing tensile strength in the longitudinal and transverse directions, and consequently a poor resistance to tear propagation (film tear strength). Therefore, films from such high-isotactic polybutene-1 are not suitable for many fields of application.

By increasing the atactic proportion of such polybutene-1 polymers, the transparency of such films formed therefrom can be improved only slightly. For example, if the atactic proportion is not separated together with the solvent during the working-up step following polymerization, but instead is left in the product by precipitation of the total polymeric product with alcohol or by evaporation of the polymerization solvent, a polybutene-1 is obtained whose films show only a small improvement in transparency, even in the case of polymer products containing 10–20% ether-soluble (atactic) proportions. Moreover, the resistance to continued tearing is not improved compared to films formed from the highly isotactic polybutene-1 and differs widely in the longitudinal and transverse directions, e.g., 24.8 kp./mm. in the longitudinal direction and 0.89 kp./mm. in the transverse direction.

U.S. Pat. No. 3,468,862 discloses a method of improving the transparency of films of conventional polybutene-1 polymers but that method, since it involves biaxial stretching, produces films which cannot be satisfactorily heat sealed.

Since heat sealable transparent films having the other excellent properties of polybutene-1 would be desirable, there is a need for a commercially feasible process for the production of a polybutene-1 from which transparent films can be formed which have satisfactory resistance to tear propagation.

For illustrative prior art relating to the polymerization of olefins, see U.S. Pat. No. 2,909,511; 3,051,690; 3,058,963; 3,058,970; 3,362,940; 3,108,973; 3,385,817; 3,468,862, and British Pat. No. 1,017,848. U.S. Pat. No. 3,108,973 employs a catalyst which contains $AlRCl_2$ and does not produce a polybutene having the properties of the polybutene of this invention. U.S. Pat. No. 3,058,970 is a broad teaching of suspensions polymerizations of 1-olefins in inert solvents. U.S. Pat. No. 3,051,690 broadly describes solution polymerizations in n-heptane. U.S. Pat. No. 3,058,963 is a more specific teaching within the broad teaching of 3,058,970. U.S. Pat. Nos. 2,909,511; 3,362,940 and British Pat. No. 1,017,848 describe polybutenes differing from those of this invention. U.S. Pat. No. 3,468,862 discloses a process for increasing the clarity of films.

SUMMARY OF THE INVENTION

In a process aspect, this invention relates to a process for the production of a polybutene-1 mixture formable without modification directly into transparent heat sealable films having good tear resistance in both the longitudinal and transverse direction, said polybutene-1 have an RSV of 2.0–4.5 dl./g. corresponding to a molecular weight of 76,000–2,112,000, a 10–30% ether soluble proportion, a Vicat temperature of about 105° C., 80–150 kp./cm$^2$ yield strength, 160–380 kp./cm$^2$ tensile strength at rupture and 300–600% elongation at rupture, which comprises the steps of (a) solution polymerizing either liquid butene-1 or the butene-1 in a liquid C$_4$ fraction consisting of 35–95% butene-1 and one or both of butene-2 and butane, alone or in the presence of 0.1–15% by weight of an α-olefin co-monomer, at 60°–120° C., to a polybutene-1 concentration in the polymerization mixture of 15–75%, employing as the polymerization catalyst a dihalide-free mixture consisting essentially of diethylaluminum monochloride and TiCl$_3$.nAlCl$_3$ wherein n is 0.2 to 0.6, and (b) isolating without fractionation thereof the thus-produced polybutene-1 mixture.

In a composition aspect, this invention relates to the thus-produced polybutene-1.

In an article of manufacture, this invention relates to transparent films formed from the thus-produced polybutene-1.

DETAILED DESCRIPTION

The catalyst employed in the process of this invention is critical for producing a polybutene-1 formable directly, without fractionation and by conventional film forming techniques, into transparent heat-sealable films. The catalyst is a dihalide free mixture consisting essentially of diethylaluminum monochloride and TiCl$_3$.nAlCl$_3$ wherein n is 0.2 to 0.6.

The TiCl$_3$.nAlCl$_3$ portion of the catalyst can be produced by the reduction of titanium tetrachloride with an organoaluminum compound at −10° C. to +30° C., preferably −10° C. to 0° C. and removal of the concurrently produced organoaluminum dichloride compound. Suitable organoaluminum compounds are alkylaluminum sesquichloride, dialkylaluminum monochloride, aluminum trialkyl and aluminum dialkylhydride. The preferred organoaluminum compound is ethylaluminum sesquichloride, which is preferably employed as a 10–30% hydrocarbon solution, e.g., hexane. An amount of organoaluminum compound is employed which provides a ratio of TiCl$_3$ to AlCl$_3$ in the catalyst of from 5:1 to 1.67:1, preferably 3 to 1.8:1. The reaction produces the TiCl$_3$.nAl$_3$ as a precipitate and a solution of the concurrently produced ethylaluminum dichloride in the hydrocarbon solvent.

The resultant catalyst precipitate produced by the reduction of the TiCl$_4$ with the organoaluminum compound can be isolated by decanting the hydrocarbon and washing the catalyst with an inert hydrocarbon solvent, e.g., butane or hexane, thereby removing the concurrently formed organoaluminum dichloride.

The isolated catalyst can, if desired, be tempered, e.g., by heating at 70°–150° C., preferably 100°–130° C., for 4 to 8 hours, to vary the optimum polymerization temperature. The washed and optionally tempered TiCl$_3$.nAlCl$_3$ catalyst is thereafter mixed with diethylaluminum monochloride to form the final mixed catalyst. The molar ratio of TiCl$_3$.nAlCl$_3$ to diethylaluminum monochloride is preferably 1:1 to 1:3, especially 1:1.5 to 1:2.0.

Alternatively, since the non-separated and non-washed TiCl$_3$.nAlCl$_3$ catalyst suspension contains ethylaluminum dichloride, produced by reduction of the ethylaluminum sesquichloride, this compound can, if desired, be used as the source of diethylaluminum monochloride by converting it thereto prior to the polymerization, e.g., by the addition of triethylaluminum to the catalyst precipitate and solvent mixture.

The catalyst is employed at a concentration of 0.1–10 millimoles/liter. The necessary catalyst concentration is dependent on the butene-1 concentration and the presence of impurities interfering with the polymerization. Impurities are e.g., water, alcohols, and other compounds with —OH, —NH$_2$, —NH, —SH groups, butadien-1,2, propadiene in ppm amounts. They decrease the activity of the catalyst. The ratio of butene-1 to catalyst is 1000 g. butene-1 to 2–1000 mg. TiCl$_3$.nAlCl$_3$, preferably 1000 g. butene-1 to 50–250 mg. TiCl$_3$.nAlCl$_3$.

Although the polymeriztion is preferably conducted in substantially pure butene-1, e.g., of at least 95%, preferably about 98% or higher purity, the polybutene-1 can be employed as a C$_4$-fraction containing, e.g., 35–95%, preferably at least 50% butene-1 and one or both of butene-2 and butane. Alternatively or additionally, the butene-1 can be present as a mixture with 0.1–15% by weight, based on the butene-1, of an α-olefin comonomer.

Suitable α-olefin comonomers include propene, 1-pentene, 1-hexene, 1-octene and 1-dodecene, with propene being preferred.

The polymerization is conducted as a solution polymerization in liquid butene-2 or a liquid C$_4$ fraction as the sole polymerization solvent.

The polymerization is conducted at temperatures of 60°–120° C., preferably 70°–100° C. The optimum temperature varies according to the catalyst treatment and the presence of other compounds besides butene-1. For example, when untempered TiCl$_3$.nAlCl$_3$ catalyst is used, a polymerization temperature of 60°–80° C. is preferably employed, whereas when the tempered TiCl$_3$.nAlCl$_3$ catalyst is employed, the polymerization is preferably conducted at 80°–120° C. When the polymerization is conducted in the presence of a comonomer, the polymerization preferably is conducted at 70°–95° C., preferably using a tempered TiCl$_3$.nAlCl$_3$ catalyst.

When the polymerization is conducted in the presence of a comonomer, the amount employed is dependent on the polymerization temperature and its effect on relative monomer polymerization activity. For example, when using propene as comonomer, at a polymerization temperature of 70° C., the amount employed is preferably 7–12% by weight, based on butene-1; at a polymerization temperature of 80° C., preferably 3–5% by weight; and at a polymerization temperature of 90° C., preferably 2–3% by weight.

Higher polymerization temperatures and the use of larger amounts of comonomers lead to products having too high an atactic ether-soluble proportion for good film production. A higher ether-soluble proportion, e.g., greater than 30%, increases the tackiness of the films and causes an undue drop in yield strength values. At lower polymerization temperatures, products are obtained having a poor tear propagation resistance. Furthermore, the economically advantageous solution polymerization cannot be accomplished at lower temperatures.

The polymerization is conducted at a pressure which maintains the butene-1 as a liquid, e.g., 7–25 atmospheres gauge. The hydrogen partial pressure is the partial pressure of the total pressure, corresponding to the content of hydrogen in the gaseous mixture.

The polymerization can be conducted either continuously, semicontinuously or discontinuously. Molecular weight regulators, e.g., hydrogen, can be employed for molecular weight control. The polymerization is preferably conducted to a polybutene-1 concentration in the polymerization mixture of 15–75%, preferably 20–50%. The polymerization can be terminated in any conventional manner, preferably by destroying the catalyst, e.g., with water.

Isolation of the polybutene-1 mixture of polymers is conveniently accomplished by venting the reactor, thus volatilizing residual butene-1, which can be collected for re-use, and any other volatiles in the reaction mixture. In so doing, fractionation of the polybutene-1 and removal of the ether-soluble portion therefrom is avoided.

Catalyst residue removal from the polybutene-1 is accomplished in the conventional manner.

The thus-produced polybutene-1 mixture has RSV values of 2.0–4.5, preferably 2.5–3.5 dl./g., which corresponds to molecular weights of 76,000–2,112,000, preferably 1,020,000–1,554,000. The polymer is a mixture of polybutenes, as evidenced by the fact it has an ether-soluble proportion of 10–30%, preferably 15–25%. The polybutene-1 mixture has yield strength values of 80–150 kp./cm$^2$, preferably 90–120 kp./cm$^2$; tensile strength at rupture values of 160–380 kp./cm$^2$; and elongation at rupture values of 300–600%. These characteristic values are similar in several respects to the characteristic values of high-pressure polyethylene. As distinguished from high-pressure polyethylene, the polybutene-1 has substantially higher molecular weights and better dimensional stability at elevated temperatures. For example, the Vicat A temperature of the polybutene-1 is approximately 105° C., while that of high-pressure polyethylene is only about 90° C.

The novel polybutene-1 can be formed into transparent films, i.e., films having visible light transmission values greater than 90%, e.g., 92% for a 60μ film, measured with a Beckmann DK spectrometer with reflection attachment (Ulbricht-Ball).

The films have good tear propagation resistance in both directions, typically 10–15 kp./mm. in the longitudinal direction and 20–28 kp./mm. in the transverse direction. In contrast thereto, films formed either from a highly isotactic polybutene-1 or from a polybutene-1 brought to the same ether-soluble proportion of 10–20% by a conventional working-up process have substantially poorer tear propagation values, e.g., 0.4–2.2 kp./mm. longitudinally and 24–28 kp./mm. transversally. Films made of polymers having such widely differing tear propagation values in their longitudinal and transverse directions continue to tear in one direction even under minor stress. The lower tear propagation resistance can, with these films, be in the longitudinal direction as well as transverse to the processing direction. Compared to high-pressure polyethylene, films from these novel polybutene-1, in addition to being more dimensionally stable at higher temperatures, have the further significant advantages of better cold flow, higher penetration strength, low gas and water vapor permeability, tear strength values which are not as temperature dependent, and an improved stress crack resistance. The films are readily heat-sealed and have excellent extensibility. With appropriate stabilization, the polybutene-1 can be formed into films particularly suitable for the manufacture of degradable mulching films. No problems are encountered in making films of the polybutene-1 produced according to this invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

(a) Preparation of a TiCl$_3$.0.5 AlCl$_3$ Catalyst 1 mole of titanium tetrachloride (100% strength) is added dropwsie under agitation within 6 hours to a 20% solution of 1.4 mole of ethylaluminum sesquichloride (molecular weight 123.7) in hexane, cooled to −5° C. After a post reaction period of 15 hours to 0° to +10° C., the catalyst suspension is tempered for 6 hours at 150° C. Thereafter, the thus-precipitated catalyst is separated from the hexane and then washed twice with hexane. In a practically quantitative yield, 1 mole of titanium trichloride catalyst is obtained having the composition TiCl$_3$.0.54 AlCl$_3$.

(b) Polymerization

With the aid of a mixed catalyst of 0.0066 part by weight of this TiCl$_3$ catalyst and 0.0073 part by weight diethylaluminum monochloride, butene-1 is polymerized in 36 parts by weight of butene-1 (98%) at 100° C. and under a pressure of 19–16 atmospheres gauge. After a polymerization period of 6 hours, the polymerization is stopped by adding 0.1 part by weight of water. By a simple expansion of the polybutene-1 solution, 18 parts by weight of a polybutene-1 is obtained. The following characteristic values are compared with high-pressure polyethylene (I) and highly isotactic polybutene-1 (II) in Table 1:

TABLE 1

|  | Example 1 | (I) | (II) |
|---|---|---|---|
| Mv: | 1,499,000* | 37,000* | 1,280,000* |
| RSV | 3.4 dl./g. | 1.12 dl./g. | 3.0 dl./g. |
| MI$_{190/5}$ | 2.4 g./10 minutes | 6.1 g./10 minutes | 3.0 g./10 minutes |
| Density | 0.9038 g./cm$^3$ | 0.9118 g./cm$^3$ | 0.916 g./cm$^3$ |
| Ether extract | 18.5% | — | 0.8% |
| Yield strength | 98 kp./cm$^2$ | 97 kp./cm$^2$ | 220 kp./cm$^2$ |
| Tensile strength at rupture | 307 kp./cm$^2$ | 180 kp./cm$^2$ | 350 kp./cm$^2$ |
| Elongation at rupture | 409% | 567% | 270% |
| Vicat A | 105° C. | 90° C. | 120° C. |

*Calculated from solution viscosity.

An 0.05 mm. thick film produced by extrusion of this material has the following characteristic values:

TABLE 2

|  |  | Example 1 | (I) | (II) |
|---|---|---|---|---|
| Yield strength | longitudinal | 206 kp./cm$^2$ | 80–230 | 222 |
| " | transverse | 180 kp./cm$^2$ | 50–205 | 222 |
| Elongation at | longitudinal | 16% | — | 16 |
| yield point | transverse | 16% | — | 16 |
| Tensile strength | longitudinal | 387 kp./cm$^2$ | 80–230 | 444 |
| at rupture | transverse | 267 kp./cm$^2$ | 50–205 | 233 |
| Elongation at | longitudinal | 243% | 430–545 | 138 |
| rupture | transverse | 376% | 620–745 | 268 |
| Tear propagation | longitudinal | 14.0 kp./mm. | 7.2–16.8 | 0.4–2.2 |
| resistance | transverse | 26.8 kp./mm. | 10.8–22.8 | 4.4–28.4 |
| Tensile impact | longitudinal | 1065 kpcm/cm$^2$ | — | 639 |
| test | transverse | 1183 kpcm/cm$^2$ | — | 305 |
| Tensile notch | longitudinal | 232 kpcm/cm$^2$ | — | 132 |
| impact test | transverse | 225 kpcm/cm$^2$ | — | 124 |
| Transparency |  |  |  |  |

EXAMPLE 2

With the aid of 0.01 part by weight of the titanium trichloride mixed catalyst produced according to Example 1 (a) and 0.011 part by weight of diethylaluminum monochloride, butene-1 is polymerized in 36 parts by weight of a 98% butene-1 at 70° C. under a hydrogen partial pressure of 0.25 atmosphere and a total pressure of 10–8 atmospheres gauge. After a polymerization time of 6 hours, the polymerization is stopped by the addition of 0.1 part by weight of water. By simple expansion of the polybutene-1 solution, 20 parts by weight of a polybutene-1 is obtained having the following properties:

| Mv: | 1,176,000 |
|---|---|
| RSV | 2.8 dl./g. |
| MI$_{190/2.16}$ | 0.8 g./10 min. |
| MI$_{190/5}$ | 6.4 g./10 min. |
| Density | 0.9061 g./cm$^3$ |
| Ether extract | 12.9% |
| Yield strength | 137 kp./cm$^2$ |
| Tensile strength at rupture | 373 kp./cm$^2$ |
| Elongation at rupture | 330% |
| Vicat A | 105° C. |

COMPARATIVE EXAMPLE 2a

With the aid of a mixed catalyst of 0.013 part by weight of commercially available aluminum-reduced titanium trichloride TiCl$_3$.0.33 AlCl$_3$ (having a higher crystallinity than that of a TiCl$_3$ which is produced by aluminum-reduction with aluminum alkyl) and 0.015 part by weight of diethylaluminum monochloride, butene-1 is polymerized in 36 parts by weight of a 98% butene-1 at 35° C., under a hydrogen partial pressure of 1.2 atmospheres and a total pressure of 4.5–3.5 atmospheres gauge. After a polymerization time of 6 hours, the polymerization is stopped by adding 0.1 part by weight of water. By simple expansion of the polybutene-1 suspension, 12 parts by weight of a polybutene-1 is obtained having the following characteristic values:

| | |
|---|---|
| Mv: | 968,000 |
| RSV | 2.4 dl./g. |
| MI$_{190/2.16}$ | 3.1 g./10 min. |
| MI$_{190/5}$ | 17.2 g./10 min. |
| Density | 0.9095 g./cm$^3$ |
| Ether extract | 11.2% |
| Yield strength | 158 kp./cm$^2$ |
| Tensile strength at rupture | 180 kp./cm$^2$ |
| Elongation at rupture | 127% |
| Vicat A | 108° C. |

COMPARATIVE EXAMPLE 2b

If, after the polymerization and catalyst decomposition, the atactic proportion is extensively separated by filtration, a polybutene-1 is produced having the following characteristic values:

| | |
|---|---|
| Mv: | 1,019,000 |
| RSV | 2.5 dl./g. |
| MI$_{190/2.16}$ | 2.8 g./10 min. |
| MI$_{190/5}$ | 13.6 g./10 min. |
| Density | 0.9173 g./cm$^3$ |
| Ether extract | 1.9% |
| Yield strength | 231 kp./cm$^2$ |
| Tensile strength at rupture | 357 kp./cm$^2$ |
| Elongation at rupture | 327% |
| Vicat A | 122° C. |

The films produced from the products as obtained in Example 2 and Comparative Examples 2a and 2b have the following characteristic values:

TABLE 3

| | | | 2 | 2 a | 2 b |
|---|---|---|---|---|---|
| Yield Strength | longitudinal | kp./cm$^2$ | 238 | 120 | 187 |
| | transverse | " | 191 | 145 | 213 |
| Elongation at yield point | longitudinal | % | 16 | 16 | 16 |
| | transverse | % | 16 | 16 | 16 |
| Tensile strength at rupture | longitudinal | kp./cm$^2$ | 346 | 380 | 413 |
| | transverse | " | 278 | 247 | 225 |
| Elongation at rupture | longitudinal | % | 190 | 126 | 142 |
| | transverse | % | 302 | 270 | 276 |
| Resistance to tear propagation | longitudinal | kp./mm. | 12.8 | 24.8 | 0.6 |
| | transverse | " | 23.1 | 0.89 | 26.7 |
| Tensile impact test | longitudinal | kp.cm./cm$^2$ | 226 | 1049 ± 340 | 639 |
| | transverse | " | 238 | 496 ± 430 | 305 |
| Tensile notch impact test | longitudinal | kp.cm./cm$^2$ | 226 | 128 ± 44 | 132 |
| | transverse | " | 238 | 107 ± 35 | 124 |
| Penetration | | kp. | 27.2 | 20.1 | 20.4 |
| Transparency | | | | | |

EXAMPLE 3

In accordance with the disclosure of Example 1, copolymers of butene-1 with propene are produced at polymerization temperatures of 70° C., 80° C., and 90° C., which copolymers are likewise very well suitable for the manufacture of film.

TABLE 4

| Example | % Propene Based on Butene-1 | RSV dl./g. | MI$_{190/5}$ g./10 min. | Yield Stress kp./cm$^2$ | Tensile Strength at Rupture kp./cm$^2$ | Elongation at Rupture % |
|---|---|---|---|---|---|---|
| Polymerization Temperature: 70° C. | | | | | | |
| 3.a | 2.5 | 3.7 | 1.8 | 158 | 324 | 327 |
| 3.b | 5.0 | 3.4 | 2.9 | 135 | 347 | 290 |
| 3.c | 10.0 | 3.7 | 6.6 | 106 | 286 | 347 |
| Polymerization Temperature: 80° C. | | | | | | |
| 3.d | 2.5 | 3.2 | 3.4 | 129 | 306 | 317 |
| 3.e | 5.0 | 3.2 | 2.8 | 88 | 313 | 537 |
| Polymerization Temperature: 90° C. | | | | | | |
| 3.f | 2.5 | 3.4 | 3.6 | 103 | 301 | 443 |

EXAMPLE 4

(a) Production of a TiCl$_3$.0.5 AlCl$_3$ Catalyst

One mole of titanium tetrachloride (100%) is added dropwise under agitation within 6 hours to a 20% solution of 1.4 moles of ethylaluminum sesquichloride (molecular weight 123.7) in hexane, cooled to −5° C. After a post reaction time of 15 hours at 0° C. to +10° C., the precipitated catalyst is separated and washed twice with hexane, giving a practically quantitative yield of 1 mole of a titanium trichloride catalyst having the composition TiCl$_3$.0.53 AlCl$_3$.

(b) Polymerization

With the aid of 0.0066 part by weight of this titanium trichloride catalyst and 0.0073 part by weight of diethylaluminum monochloride, butene-1 is polymerized in 36 parts by weight of butene-1 (98%) at 70° C., under a hydrogen partial pressure of 0.2 atmosphere and a total pressure of 10–8 atmospheres gauge. After a polymerization time of 8 hours, the polymerization is stopped by adding 0.1 part by weight of water. By simple expansion of the polybutene-1 solution, 21 parts by weight of a polybutene-1 is obtained having the following characteristic values:

| | |
|---|---|
| Mv: | 1,390,000 |
| RSV | 3.2 dl./g. |
| MI$_{190/2.16}$ | 0.4 g./10 min. |
| MI$_{190/5}$ | 2.9 g./10 min. |
| Density | 0.9050 g./cm$^3$ |
| Ether extract | 12.7% |
| Yield stress | 98 kp./cm$^2$ |
| Tensile strength at rupture | 266 kp./cm$^2$ |
| Elongation at rupture | 430% |

A. Film (mm. thickness) produced by extrusion of this material has the following properties:

| | | | |
|---|---|---|---|
| Yield stress | longitudinal | kp./cm$^2$ | 352 |
| | transverse | " | 267 |
| Elongation at yield point | longitudinal | % | 16 |
| | transverse | % | 16 |
| Tensile strength at rupture | longitudinal | kp./cm$^2$ | 352 |
| | transverse | " | 267 |
| Elongation at rupture | longitudinal | % | 209 |
| | transverse | % | 285 |
| Tear propagation | longitudinal | kp./mm. | 8.9 |

| -continued | | | |
|---|---|---|---|
| resistance | transverse | " | 16.2 |
| Tensile impact test | longitudinal | kp.cm./cm² | 1165 |
| | transverse | " | 1810 |
| Penetration | | kp. | 27.4 |
| Transparency | | | |

EXAMPLE 5

(a) Production of a TiCl₃.0.5 AlCl₃ Catalyst Suspension

One mole of titanium tetrachloride (100% strength) is added dropwise during 6 hours under agitation to a 20% solution of 1.4 moles of ethylaluminum sesquichloride (molecular weight 123.7) in hexane, cooled to $-5°$ C. For purposes of conducting a post reaction, the suspension is stireed for 15 hours at $0°$ C. to $+10°$ C. and then tempered for 6 hours under agitation at $140°$ C.

(b) Polymerization

Into a pressure-resistant agitator-equipped vessel having a capacity of 2 m³, there is charged at a temperature of $60°$ C. 600 parts by weight of a C₄-cut containing 54% butene-1, 23% transbutene-2, 15% cis-butene-2, and 8% butane. The catalyst suspension produced in accordance with the part (a) of this example and 1 mole=0.114 part by weight of triethylaluminum are added thereto. Polymerization is effected at $60°$ C., under a hydrogen partial pressure of 0.3 atmosphere and a total pressure of 7.5 atmospheres gauge. After a polymerization time of 10 hours, 10 parts by weight of water is added under agitation. After expansion, 246 parts by weight of a polybutene-1 are produced having the following characteristic values:

| Mv: | 1,176,000 |
|---|---|
| RSV | 2.8 dl./g. |
| MI₁₉₀/₂.₁₆ | 0.6 g./10 min. |
| MI₁₉₀/₅ | 5.2 g./10 min. |
| Density | 0.9078 g./cm³ |
| Ether extract | 24.6% |
| Yield stress | 121 kp./cm² |
| Tensile strength at rupture | 270 kp./cm² |
| Elongation at rupture | 423% |

By conducting the polymerization at 90% C. instead of at 60° C., a polybutene-1 is obtained with the following strength values:

| Yield stress | 94 kp./cm² |
|---|---|
| Tensile strength at rupture | 219 kp./cm² |
| Elongation at rupture | 337% |

From both products, films can be manufactured having a good resistance to tear propagation.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a polybutene-1 mixture formable without modification directly into transparent heat sealable films having good tear resistance in both the longitudinal and transverse direction, said polybutene-1 having an RSV of 2.0–4.5 dl./g. corresponding to a molecular weight of 76,000–2,112,000, a 10–30% ether soluble proportion, a Vicat temperature of about 105° C., 80–150 kp.cm² yield strength, 160–380 kp./cm² tensile strength at rupture and 300–600% elongation at rupture, which comprises the steps of (a) solution polymerizing either liquid butene-1 or the butene-1 in a liquid C₄ fraction consisting of 35–95% butene-1 and one or both of butene-2 and butane, alone or in the presence of 0.1–15% by weight of an α-olefin co-monomer, at 60°–120° C., to a polybutene-1 concentration in the polymerization mixture of 15–75%, employing as the polymerization catalyst a dihalide-free mixture consisting essentially of diethylaluminum monochloride and TiCl₃.nAlCl₃ wherein n is 0.2 to 0.6 produced by the reduction of titanium tetrachloride with an organoaluminum compound at $-10°$ C. to $+30°$ C., and (b) isolating the thus-produced polybutene-1 solely by volatilizing the volatile components of the reaction mixture, whereby the mixture of polybutene-1 is not fractionated, whereby there is produced a polybutene-1 possessing said properties.

2. A process according to claim 1 wherein the polymerization is conducted in the presence of 0.1–15% by weight, based on the butene-1 of an α-olefin comonomer.

3. A process according to claim 2 wherein the comonomer is propene.

4. A process according to claim 1, wherein the TiCl₃.nAlCl₃ is subsequently tempered and the polymerization is conducted at 80°–120° C.

5. A process according to claim 3, wherein the TiCl₃.nAlCl₃ is subsequently tempered and the polymerization is conducted at 70°–95° C.

6. A process according to claim 1 wherein the substantially pure butene-1 is polymerized.

7. A process according to claim 1, wherein the TiCl₃.nAlCl₃ is untempered and the polymerization is conducted at 60°–80° C.

8. A process according to claim 1 wherein the polymerization is conducted at 60°–80° C. employing as starting monomer butene-1 of at least about 98% purity and an untempered catalyst having a ratio of TiCl₃ to AlCl₃ of from 3:1 to 1.8:1, in a molar ratio to the diethylaluminum monochloride of 1:1.5 to 1:2.0 and in an amount of 25–1,000 mg. per 1,000 g. of butene-1.

9. A process according to claim 1 wherein the polymerization is conducted at 80°–120° C. employing as starting monomer butene-1 of at least about 98% purity and a tempered catalyst having a ratio of TiCl₃ to AlCl₃ of from 3:1 to 1.8:1, in a molar ratio to the diethylaluminum monochloride of 1:1.5 to 1:2.0 and in an amount of 25–1,000 mg. per 1,000 g. of butene-1.

* * * * *